United States Patent [19]

Muroi

[11] Patent Number: 5,021,640

[45] Date of Patent: Jun. 4, 1991

[54] APPARATUS CAPABLE OF BEING OPERATED AS BOTH A BAR CODE READING DEVICE AND A MANUAL KEYBOARD

[75] Inventor: Hidenori Muroi, Shizuoka, Japan

[73] Assignee: Tokyo Electric Co., Ltd., Tokyo, Japan

[21] Appl. No.: 366,700

[22] Filed: Jun. 15, 1989

[30] Foreign Application Priority Data

Jun. 20, 1988 [JP] Japan ................... 63-152029

[51] Int. Cl.⁵ .............. G06K 7/10; G06K 7/00; G09G 3/00; H03K 17/94
[52] U.S. Cl. .................... 235/462; 235/383; 235/440; 235/470; 340/712; 341/23
[58] Field of Search ........... 340/702, 705, 712, 815.06; 235/375, 462, 383, 470, 440; 341/23

[56] References Cited

U.S. PATENT DOCUMENTS

| | | | |
|---|---|---|---|
| 4,078,257 | 3/1978 | Bagley | 364/900 |
| 4,274,093 | 6/1981 | Judge | 340/712 |
| 4,685,147 | 8/1987 | Honjo | 382/66 |
| 4,870,458 | 9/1989 | Shibuya et al. | 340/712 |
| 4,882,582 | 11/1989 | Oka | 340/712 |

FOREIGN PATENT DOCUMENTS

57-043272 3/1982 Japan .
58-8381 1/1983 Japan .

*Primary Examiner*—David Trafton
*Assistant Examiner*—Kenton R. Mullins
*Attorney, Agent, or Firm*—Frishauf, Holtz, Goodman & Woodward

[57] ABSTRACT

A bar code reading device includes a code reading section for reading a bar code attached to an article by emitting a light beam through a window and receiving therethrough the light beam reflected from the bar code, and a manual input section for inputting article information by operation of a keyboard. In the bar code reading device, the manual input section includes a transparent liquid crystal display panel, a transparent touch sensor panel disposed on the liquid crystal display panel, and a control circuit for selectively setting one of a manual input mode and an automatic reading mode, driving the liquid crystal display panel so as to display an image of keyboard in the manual input mode and to erase the image of keyboard in the automatic reading mode, and reading key-in data entered by touching portions of the touch sensor panel with reference to the image of the displayed keyboard in the manual input mode. The light beam can be transmitted via the liquid crystal display panel and the touch sensor panel in the automatic reading mode.

10 Claims, 7 Drawing Sheets

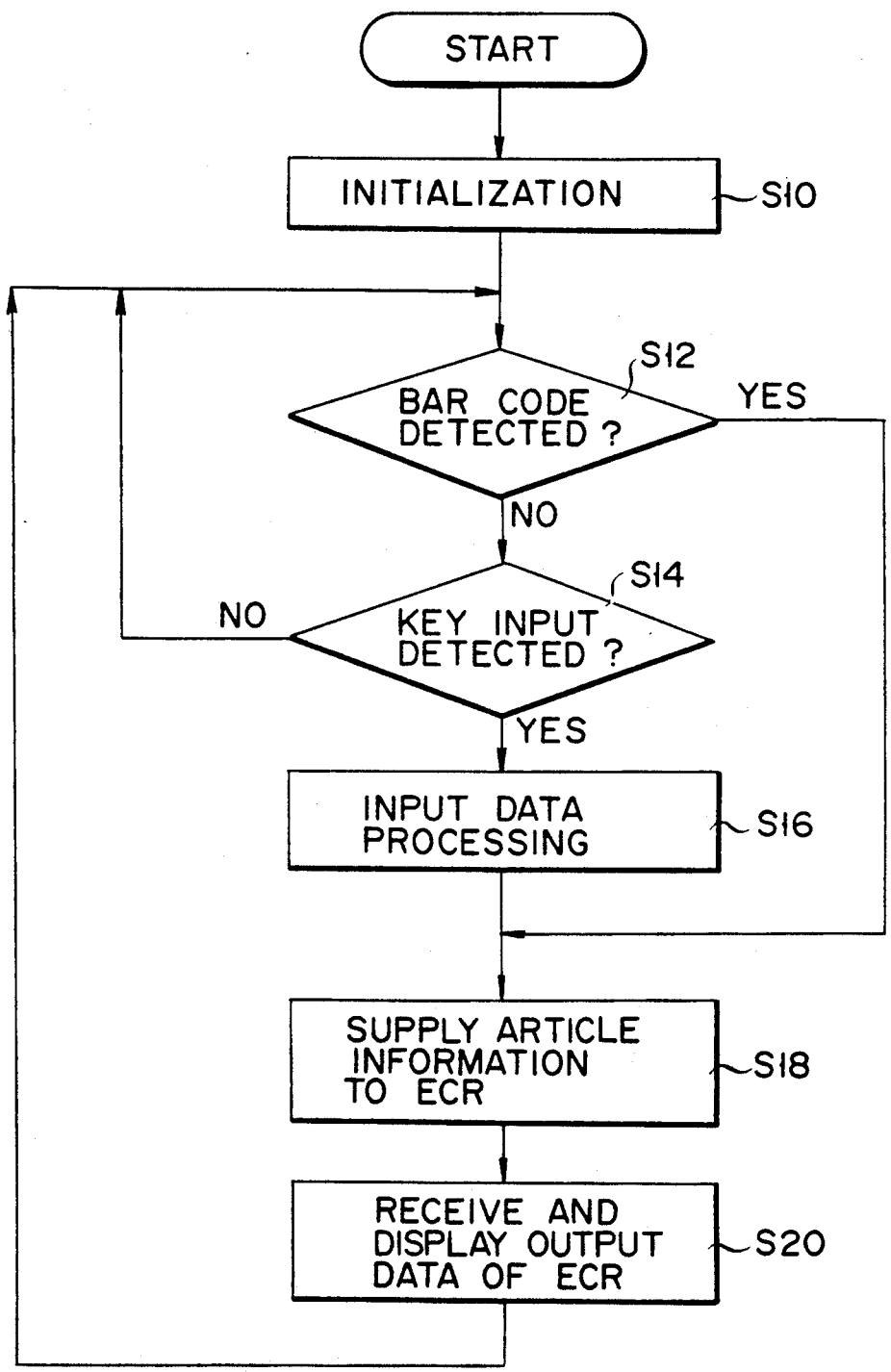
F I G. 6

APPARATUS CAPABLE OF BEING OPERATED AS BOTH A BAR CODE READING DEVICE AND A MANUAL KEYBOARD

BACKGROUND OF THE INVENTION

1. Field of the Invention

This invention relates to a bar code reading device, and more particularly to a bar code reading device to which various additional information can be input by manual keyboard operation.

2. Description of the Related Art

In order to perform speedy and accurate registration and settlement operations for purchased goods, most supermarkets utilize bar code reading devices for reading bar codes representing article information such as the individual article code of each article in stock. FIG. 1 shows a conventional bar code reading device mounted on a check-out counter. When a customer comes to the check-out counter, with a basket (or a cart) containing purchased goods, a cashier or an operator sequentially takes the articles out of the basket, one at a time, turns the bar code printed on a label of the article to face reading window WP formed on the upper surface of the cabinet, so that the bar code reading device can read the bar code, and then places each article whose bar code has been read into another basket. The bar code reading device reads the bar code by emitting a light beam through reading window WP and receiving therethrough the light beam reflected from the article and transmitted to the bar code reading device. When the bar code has been read, reading recognition lamp LP is lit and display unit DP displays the price of the article or the like obtained based on the article information corresponding to the bar code which has just been read. If no bar code is attached to the article, or if the bar code attached to the article cannot be read because of the presence of stains or smears, the article information concerning the article will be input into the bar code reading device by manually operating keyboard KP.

When the keyboard is disposed behind reading window WP and above display unit DP as shown in FIG. 1, an operator who is short must stand on tiptoe or fully stretch his arm in order to operate the keyboard. If the operator operates the keyboard in such an unnatural posture, he will easily get tired and he will erroneously operate the keyboard.

SUMMARY OF THE INVENTION

An object of this invention is to provide a bar code reading device which can be installed in a small space and which the operator can operate in a natural posture.

The object can be attained by a bar code reading device which comprises a transparent liquid crystal display section; a transparent touch sensor section formed on the liquid crystal display section; a code reader for reading a bar code attached to an article by emitting a light beam through a window constituted by the liquid crystal display section and the touch sensor section and receiving therethrough the light beam reflected from the bar code of the article; and a control circuit for selectively setting one of a manual input mode and a code reading mode, driving the liquid crystal display section to display an image of a keyboard in the manual input mode and to erase the image of the keyboard in the code reading mode, and reading key-in data entered by touching portions of the touch sensor section with reference to the image of the keyboard in the manual input mode.

In the bar code reading device, the light beam used for reading the bar code attached to the article is transmitted via the liquid crystal display section and the touch sensor section. In the manual input mode, an image of the keyboard is displayed on the liquid crystal display section and the operation of the displayed keyboard is detected by the touch sensor section. In this case, unlike the prior art case, it is not necessary to set the isolated keyboard behind the main portion and at a high position. Therefore, the operator can operate the bar code reading device in a natural posture and the occupied space of the bar code reading device can be reduced.

BRIEF DESCRIPTION OF THE DRAWINGS

FIGS. 6 and 7 are flowcharts showing the operation of a circuit shown in FIG. 3;

DETAILED DESCRIPTION OF THE PREFERRED EMBODIMENTS

There will now be described a bar code reading device according to an embodiment of this invention with reference to FIGS. 2 to 7.

Figure 1:
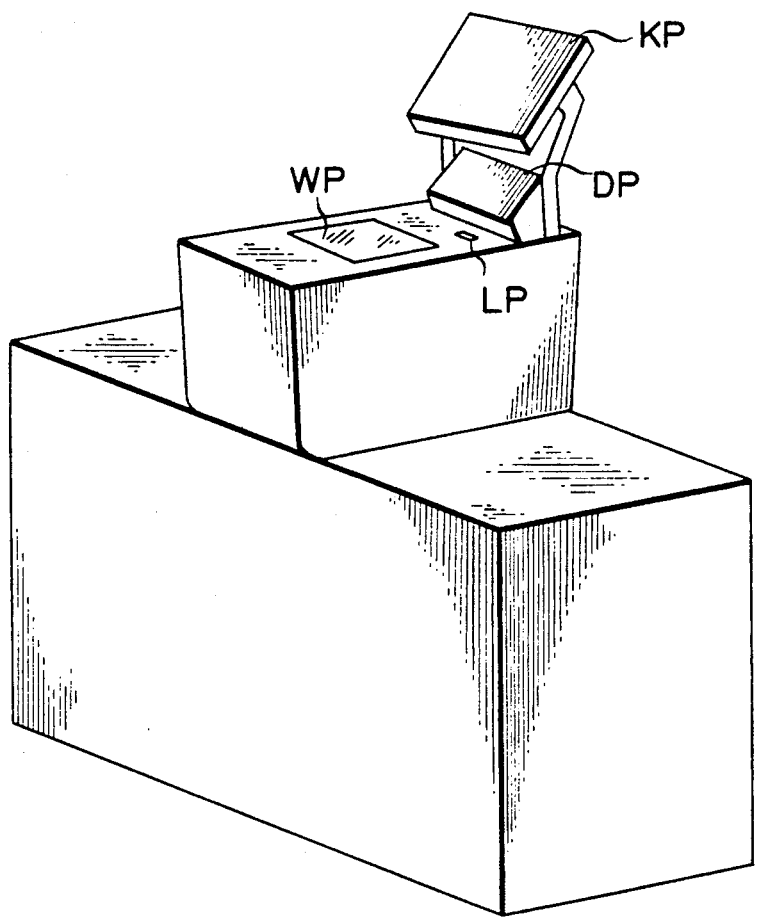
FIG. 1 is a perspective view of the conventional bar code reading device.
Figure 2:
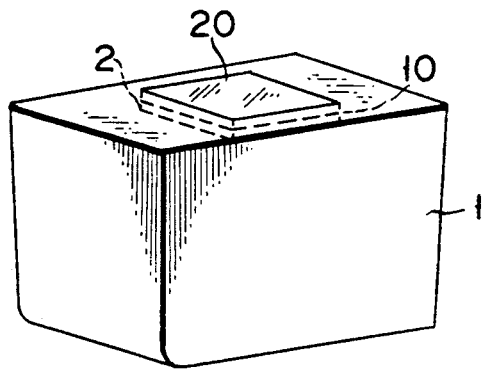
FIG. 2 is a perspective view of a bar code reading device according to one embodiment of this invention.
Figure 3:
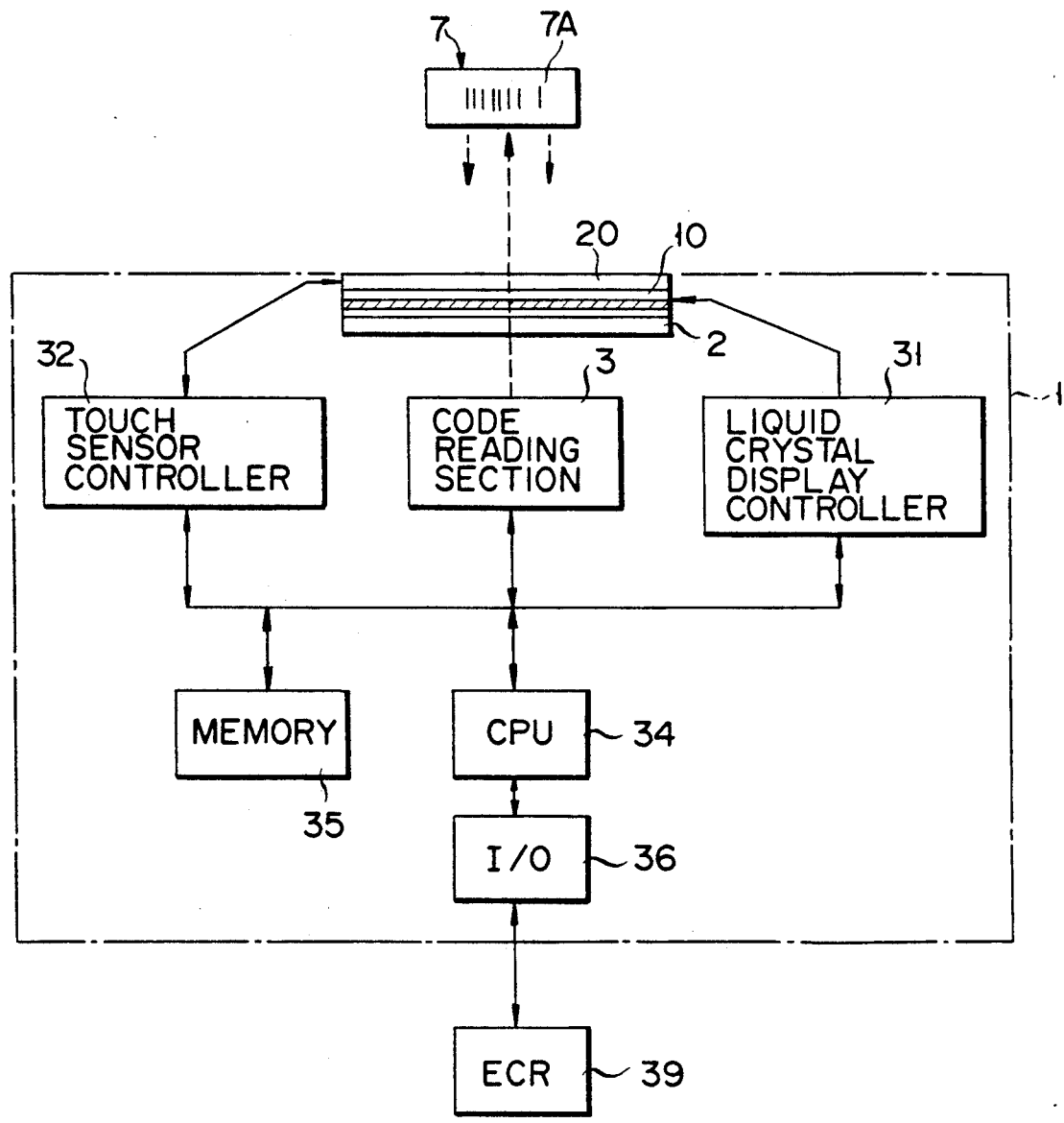
FIG. 3 is a block diagram showing the circuit construction of the bar code reading device shown in FIG. 2.
Figure 4:
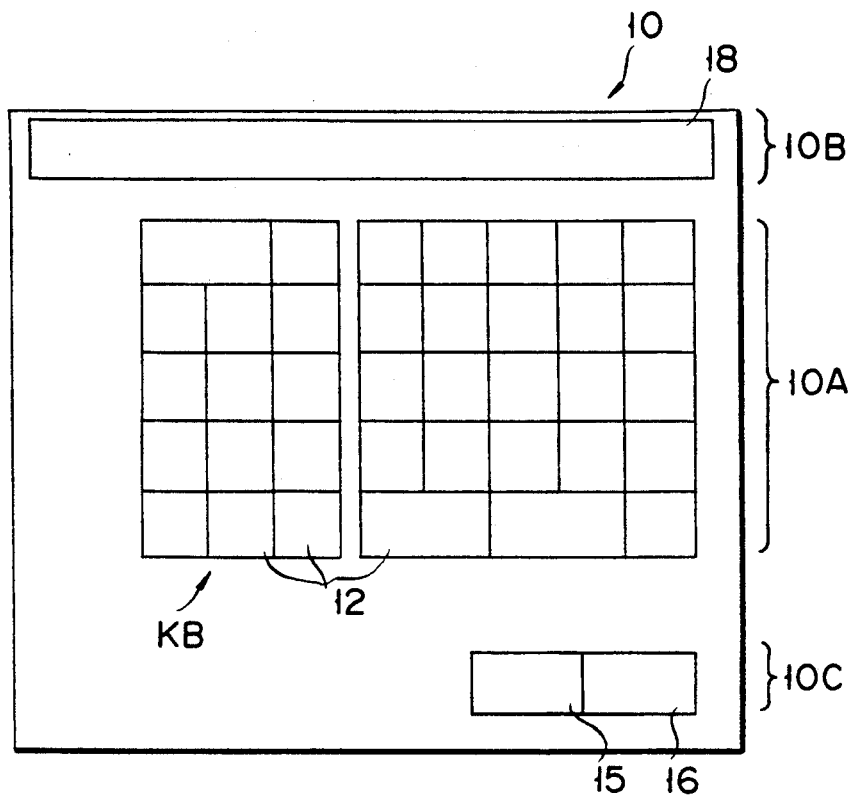
FIG. 4 is a diagram showing the plane construction of a liquid crystal display panel shown in FIG. 3.
Figure 5:
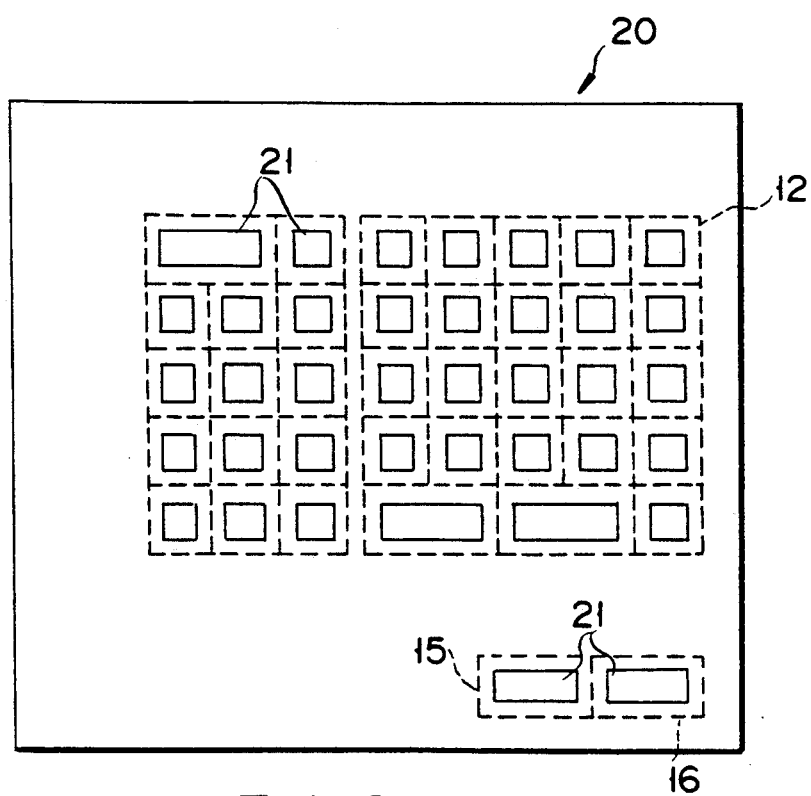
FIG. 5 is a diagram showing the plane construction of a touch sensor panel shown in FIG. 3.

FIG. 2 is a perspective view of the bar code reading device, FIG. 3 is a block diagram showing the circuit construction, FIG. 4 is a plan view of a liquid crystal display panel and FIG. 5 is a plan view of a touch panel.

As shown in FIG. 3, the bar code reading device of this embodiment includes main body 1, code reading section 3 disposed inside main body 1, reading window 2 made of glass and disposed in the surface area of main body 1, transparent liquid crystal display panel 10 mounted on reading window 2, and transparent touch sensor panel 20 disposed on panel 10. As shown in FIG. 4, liquid crystal display panel 10 includes keyboard display area 10A, data display area 10B, and mode key display area 10C. The shape and size of the liquid crystal display panel 10 and touch sensor panel 20 are the same as those of reading window 2. Keyboard display area 10A is used to display an image of keyboard KB constituted by a plurality of input keys 12 arranged in a matrix configuration and having substantially the same function as conventional input keys, data display area 10B serves to display an image of display unit 18 having substantially the same function as a conventional display unit, and mode key display area 10C serves to display images of mode keys 15 and 16 for specifying the manual input mode and the automatic reading mode, respectively.

Liquid crystal display panel 10 is controlled by means of liquid crystal display controller 31 disposed inside main body 1. At the time of interruption of display, a light beam emitted from code reading section (constituted by an optical scanning system and a reading circuit) 3 and a light beam reflected from article 7 can pass through liquid crystal display panel 10.

Touch sensor panel 20 includes a plurality of touch sensors 21 which are assigned on a one-to-one basis to the keys—i.e. input keys 12 and mode keys 15 and 16— displayed on liquid crystal display panel 10. When an operator touches any of the keys displayed on panel 10, the touch sensor assigned to this key is operated, thus enabling the data associated therewith to be entered.

However, even if—as in the case of the automatic reading mode being selected - the keyboard is not displyed on panel 10, accidental touching of the touch sensors will cause data to be generated and entered.

A light beam can pass through touch sensor panel 20 as in the case of liquid crystal display panel 10 and touch sensor panel 20 is controlled by means of touch sensor controller 32.

The bar code reading device further includes CPU 34 and memory section 35 connected to touch sensor controller 32, code reading section 3, and liquid crystal display controller 31. Memory section 35 serves to store the control program for CPU 34 and input/output data of this CPU. CPU 34 controls the operations of touch sensor controller 32, code reading section 3, and liquid crystal display controller 31 according to the control program. Further, CPU 34 is connected to an external electronic cash register (ECR) via I/O interface 36.

Figure 7:
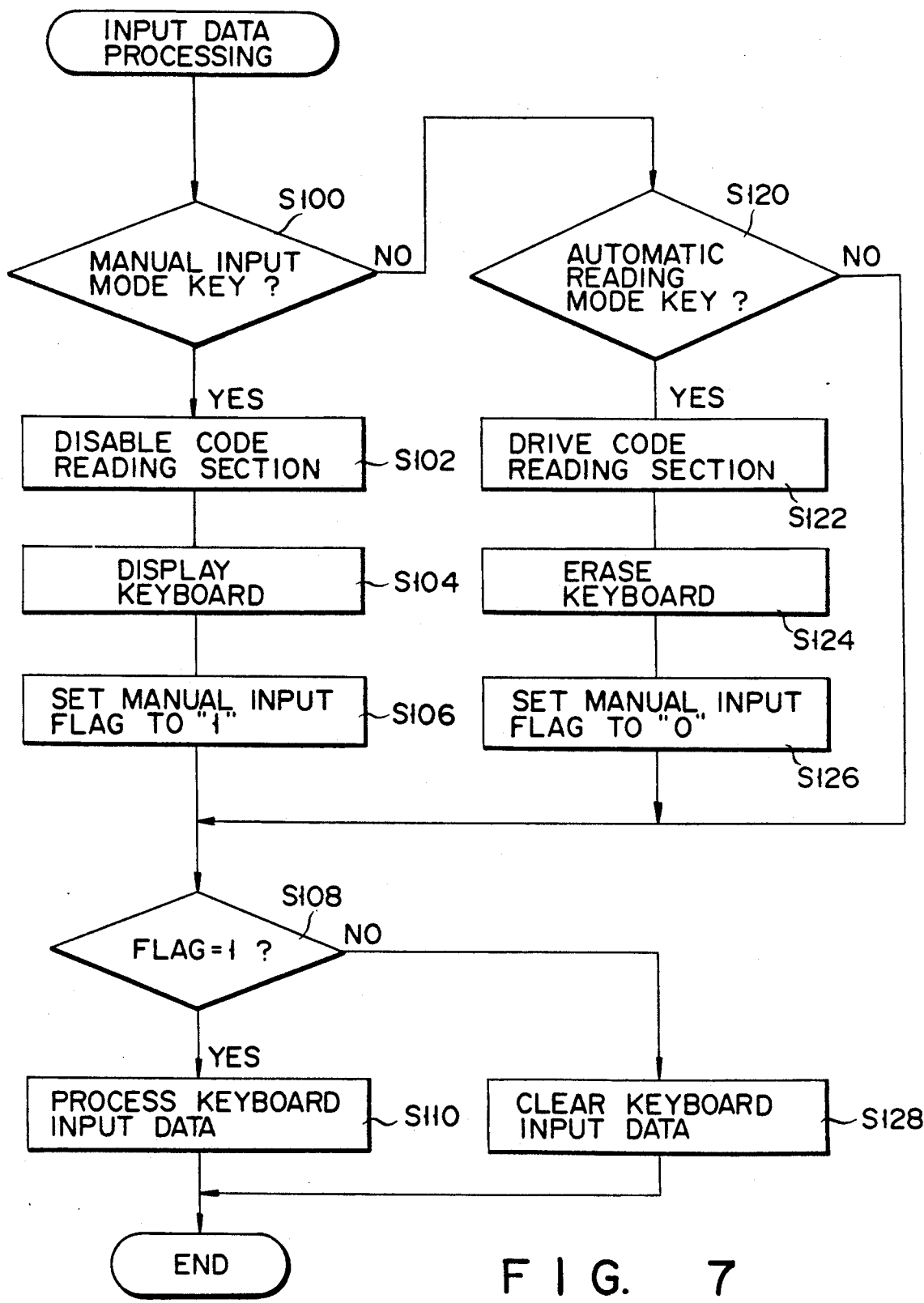

Now, the overall operation of the bar code reading device will be explained. FIGS. 6 and 7 are flowcharts showing the operation of the bar coded reading device. When operation begins, each circuit element is initialized in step S10, and then it is checked in step S12 whether or not a bar code has been detected by code reading section 3. In the initializing process, touch sensor controller 32, code reading section 3, and liquid crystal display controller 31 are driven: touch sensor controller 32 detects input data entered by operation of touch sensor 21, code reading section 3 scans article 7 by means of a light beam and detects the bar code on article 7 by way of the light beam reflected therefrom, and display controller 31 controls liquid crystal display panel 10 to display mode keys 15 and 16 and display unit 18. If it is determined in step S12 that a bar code has been detected, article information corresponding to the detected bar code is supplied to ECR 39 in step S18, and data supplied from ECR 39 is displayed on data display area 10B of liquid crystal display panel 10 in step S20. After this, step S12 is effected again.

If on the other hand, it is determined in step S12 that no bar code has been detected by code reading section 3, it is checked in step S14 whether or not a key input operation has been detected by touch sensor controller 32. If no key input operation is detected, step S12 is effected again. In contrast, if a key input operation is detected, input data is processed in step S16.

FIG. 7 shows the input data processing operation. If it is detected in step S100 that manual input mode key 15 has been operated, the operation of code reading section 3 is inhibited in step S102 and keyboard KB is displayed on keyboard display area 10A in step S104. Further, a manual input flag is set to "1" in step S106 and then step S108 is effected. If it is detected in step S120 that automatic reading mode key 16 has been operated, code reading section 3 is driven in step S122 and keyboard KB is erased in step S124. In this case, the manual input flag is set to "0" and then step S108 is effected. When keyboard KB has been operated, step S108 is effected.

If it is detected in step S108 that the manual input flag is set at "1", keyboard input data is read and processed in step S110, and then step S18 shown in FIG. 6 is effected. If, on the other hand, it is detected in step S108 that the manual input flag is set at "0", keyboard input data is cleared in step S128. After this, step S18 shown in FIG. 6 is effected. In step S18, article information obtained in the key input processing is supplied to ECR 39 in the same manner as the article information of the bar code. In step S20, ECR 39 supplies data based on the article information to CPU 34, via I/O interface 39, the data then being displayed in data display area 10B.

Further, if keyboard input data to be processed in step S110 is not present, no article information can be obtained. In this case, no operation is effected in steps S18 and S20, and the following operation is effected.

Figure 8:
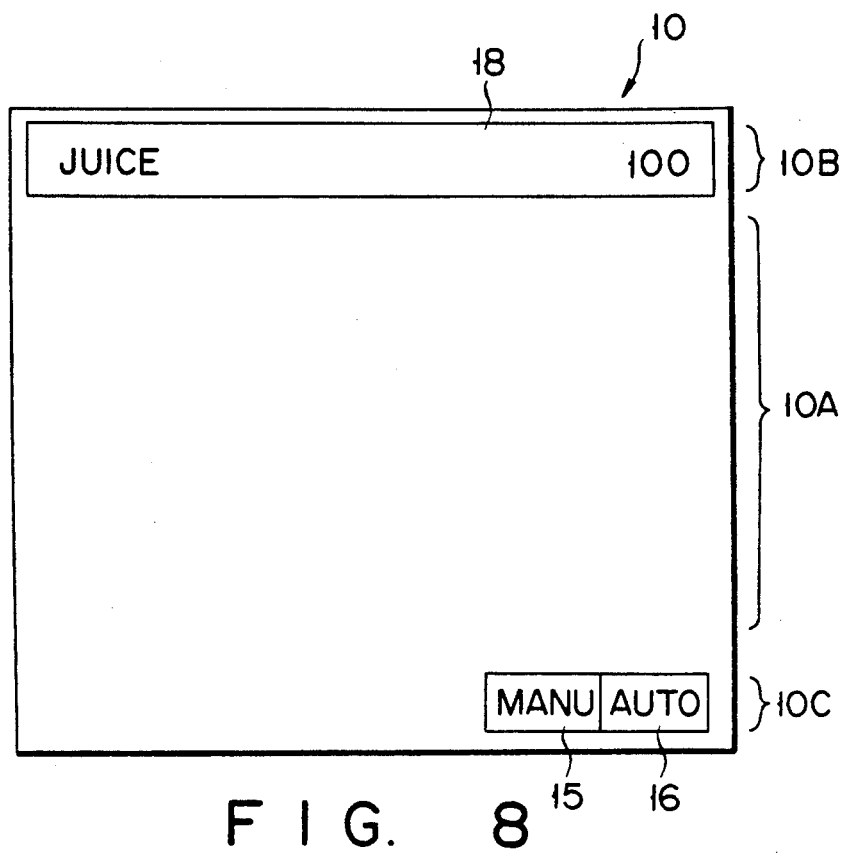
FIG. 8 shows a picture image displayed on the liquid crystal display panel in the automatic reading mode.

That is, when the operator does not operate mode key 15 after the initialization process, or when the operator touches mode key 16, the automatic reading mode is set, and display unit 18 and mode keys 15 and 16 are displayed on liquid crystal display panel 10 as shown in FIG. 8. In this case, a light beam is emitted from code reading section 3, and the light beam is transmitted to the exterior through reading window 2, liquid crystal display panel 10 and touch sensor panel 20 so as to scan the article which is disposed to face the bar code reading device. The light beam passes through portions of liquid crystal display panel 10 except display areas 10B and 10C. When the operator moves article 7 along reading window 2 with bar code 7A of article 7 set to face reading window 2, the light beam reflected from article 7 is transmitted through touch sensor panel 20, liquid crystal display panel 10 and reading window 2 and enters code reading section 3. Code reading section 3 reads the bar code based on the incident light beam and determines article information corresponding to the bar code. The article information is stored in memory section 35 and then supplied from the bar code reading device to ECR 39. In ECR 39, the article information is registered, and data representing the name and price of the article and the like obtained based on the article information is fed back to the bar code reading device and displayed as shown in FIG. 8.

Figure 9:
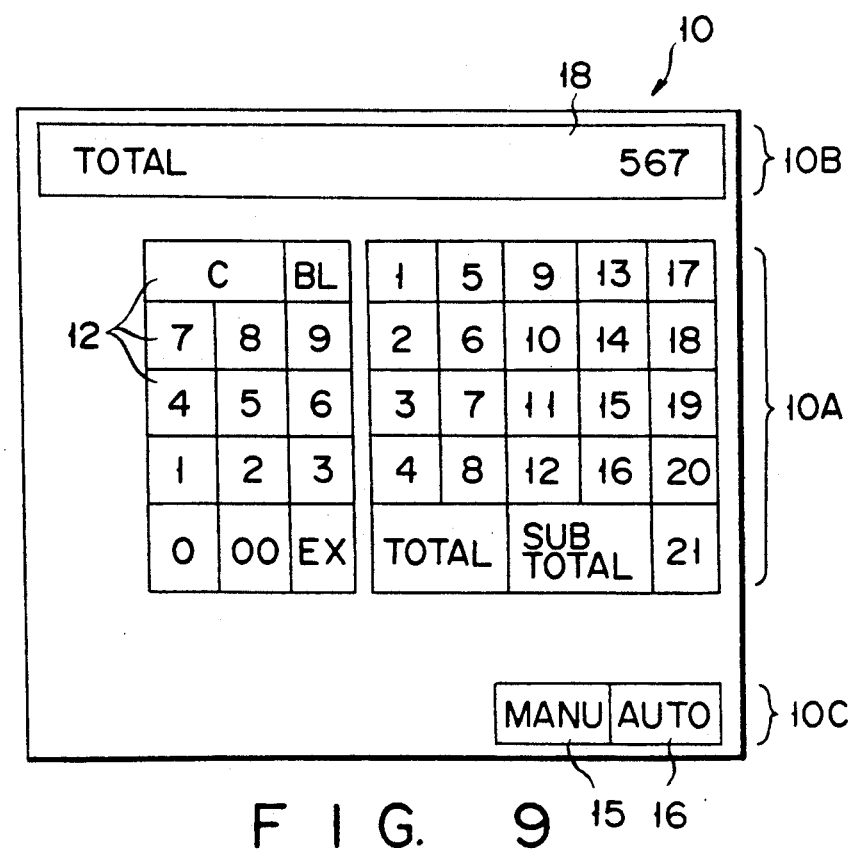
FIG. 9 shows a picture image displayed on the liquid crystal display panel in the manual input mode.

When the operator operates mode key 15, the manual input mode is set, and keyboard KB as well as display unit 18 and mode keys 15 and 16 are displayed on liquid crystal display panel 10 as shown in FIG. 9. In this case, the operation of code reading section 3 is inhibited. If, under this condition, the operator operates keyboard KB, the key operation is detected via touch sensor 20 and article information input by this operation is stored in memory section 35. Like the bar code, the article information is supplied to ECR 39 and registered therein. Data input by keyboard operation is temporarily displayed on display area 10B in order to determine that the data has been correctly input.

The mode which has been set will remain unchanged until either mode key 15 or 16 is operated.

As described above, according to this embodiment, a light beam passes an area of liquid crystal display panel 10 in the automatic reading mode, and keyboard KB is displayed on the area of liquid crystal display panel 10 and the operation of keyboard KB is detected by sensor panel 20 in the manual input mode. As a result, it becomes possible to reduce the size and weight of the bar code reading device and the operator can move each article for reading the bar code thereof and quickly and correctly effect the manual operation in the same posture.

Further, unlike the conventional case, it is not necessary for the operator to fully extend his/her arm in order to reach keyboard KB. Thus, he can quickly and efficiently effect the registration and settlement operations without feeling fatigued.

Further, since, in the automatic reading mode, input data from keyboard KB is made invalid, it is not necessary to pay much attention to the erroneous operation of keyboard KB, making it easy to handle the bar code reading device.

In addition, since mode keys 15 and 16 and display unit 18 are displayed on liquid crystal display panel 10, the construction of the bar code reading device can be further simplified.

In the above embodiment, the bar code reading device is used for the cash register, but the application of this bar code reading device is not limited to this. For example, it can also be used with reading window 2 set in an inclined or upright position to read the bar codes of packages carried on a conveyer belt.

Figure 10:
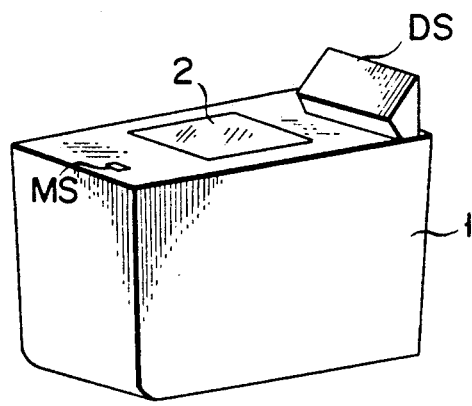
FIG. 10 is a perspective view showing a modification of the bar code reading device shown in FIG. 2.
Figure 11:
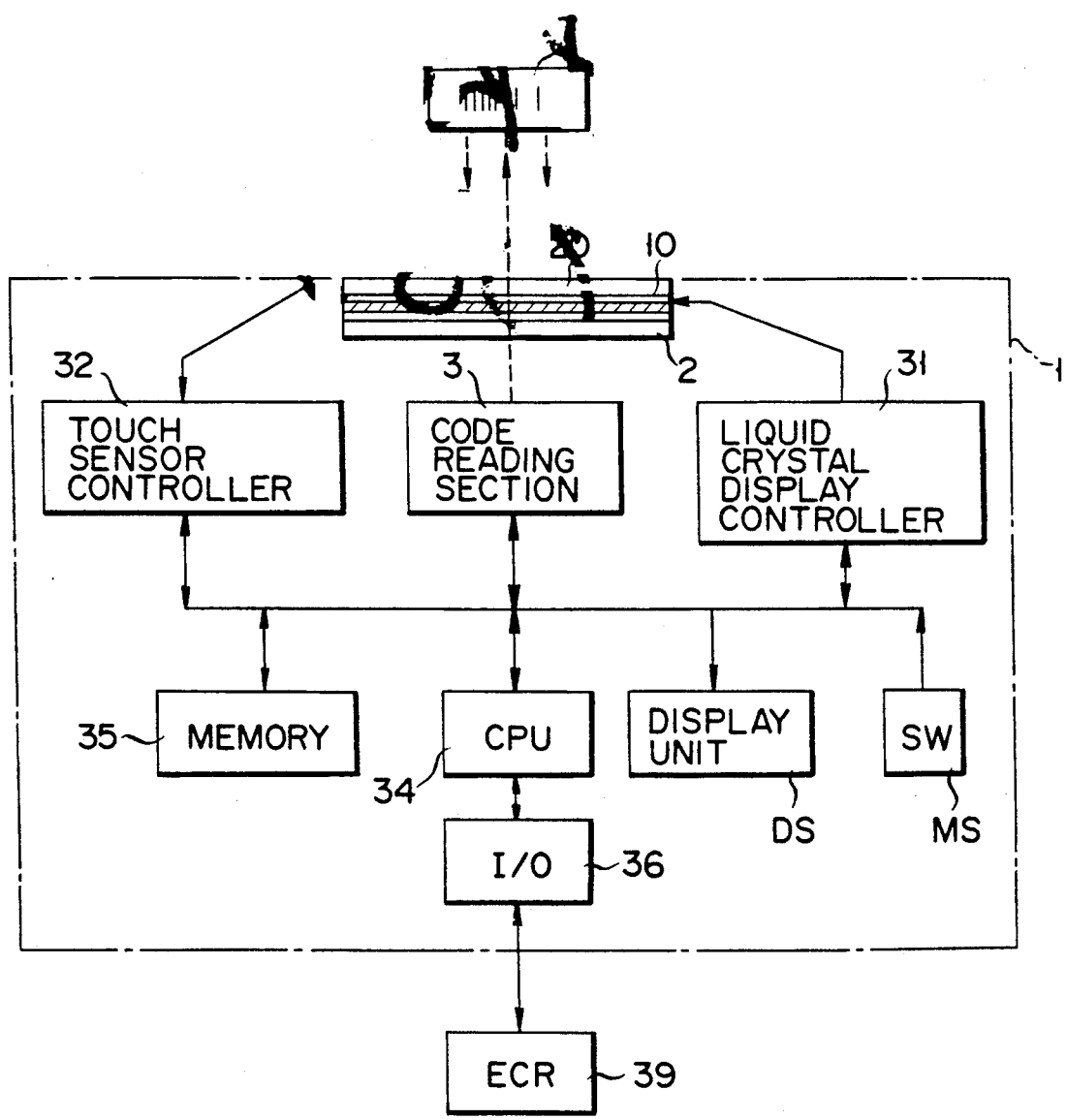
FIG. 11 is a block diagram showing the circuit construction of the modification shown in FIG. 10.

In the above embodiment, display unit 18 and mode keys 15 and 16 are displayed as picture images on liquid crystal display panel 10, but this invention is not limited to this. For example, as shown in FIG. 10, display unit DS and mode selection button MS can be provided separately from liquid crystal display panel 10. In this case, as shown in FIG. 11, display unit DS and mode selection button MS are connected to CPU 34.

What is claimed is:

1. A bar code reading device comprising:
    a transparent liquid crystal display means for displaying an image of a keyboard in a manual input mode;
    a transparent touch sensor means formed on said liquid crystal display means for entering key-in data corresponding to portions thereof which are touched with reference to said image of a keyboard displayed on said liquid crystal display means;
    a code reading means for, in a code reading mode, reading a bar code associated with an article by emitting a light beam through a window constituted by said liquid crystal display means and said touch sensor means, and for receiving therethrough a light beam reflected from the bar code; and
    control means for selectively setting one of said manual input mode and said code reading mode, and for reading key-in data entered by said touch sensor means.

2. A bar code reading device according to claim 1, wherein said control means includes driving means for driving said liquid crystal display means to display the image of said keyboard in said manual input mode and for erasing said image of the keyboard in the code reading mode, and means for ignoring key-in data inadvertently input manually with said touch sensor means during said code reading mode.

3. A bar code reading device according to claim 2, wherein said control means includes inhibiting means for inhibiting the operation of said code reading means in said manual input mode.

4. A bar code reading device according to claim 3, wherein said liquid crystal display means includes a data display area; and
    wherein said control means includes means for generating data signals in both said manual input mode and said code reading mode, and means for providing said data signals from the control means to said liquid crystal display means for display on said data display area.

5. A bar code reading device according to claim 4, wherein said liquid crystal display means includes a mode key display area in which images of first and second mode keys are displayed in both the manual input mode and the code reading mode, and said control means provides mode key display signals to said liquid crystal display means.

6. A bar code reading device according to claim 5, wherein said control means includes means for setting said manual input mode and the code reading mode in response to key-in data entered by touching the respective portions of said touch sensor means which correspond to the first and second mode keys displayed in said mode key display area.

7. A bar code reading device according to claim 1, wherein said control means includes a mode switch disposed outside of said touch sensor section, and means for setting one of said manual input mode and said code reading mode according to operation of said mode switch.

8. A bar code reading device according to claim 1, wherein said liquid crystal display means includes a data display area; and
    wherein said control means includes means for generating data signals in both said manual input mode and said code reading mode, and means for providing said data signals from the control means to said liquid crystal display means for display on said data display area.

9. A bar code reading device according to claim 1, wherein said liquid crystal display means includes a mode key display area for displaying images of first and second mode keys in both the manual input mode and the code reading mode.

10. A bar code reading device according to claim 9, wherein said control means includes means for setting said manual input mode and the code reading mode in response to key-in data entered by touching the respective portions of said touch sensor means which correspond to the displayed first and second mode keys displayed in said mode key display area.

* * * * *